H. R. RICARDO.
DRIVING MECHANISM FOR PROPELLERS.
APPLICATION FILED APR. 23, 1918.
1,298,401. Patented Mar. 25, 1919.
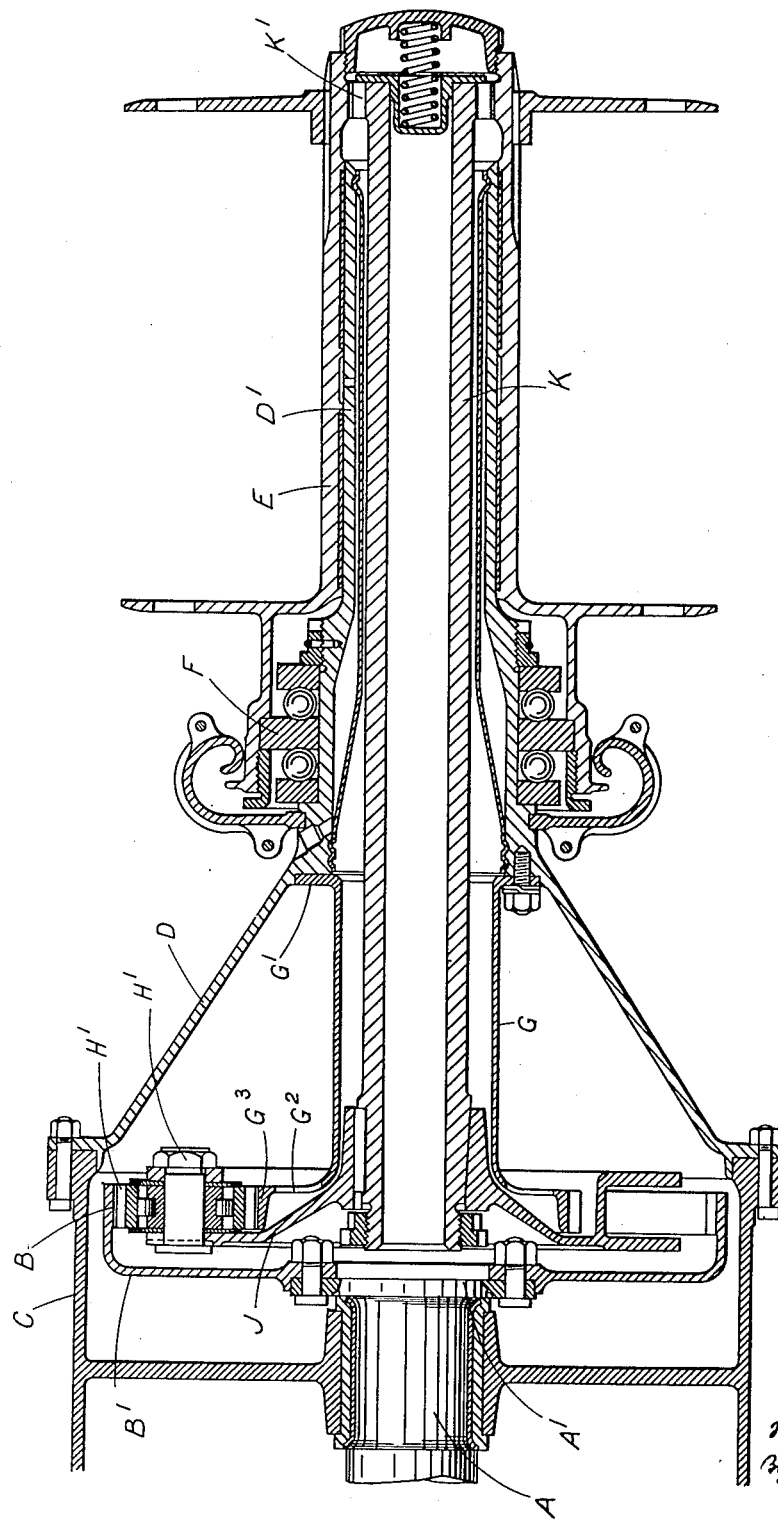

UNITED STATES PATENT OFFICE.

HARRY RALPH RICARDO, OF LONDON, ENGLAND.

DRIVING MECHANISM FOR PROPELLERS.

1,298,401.
Specification of Letters Patent. Patented Mar. 25, 1919.

Application filed April 23, 1918. Serial No. 230,357.

*To all whom it may concern:*

Be it known that I, HARRY RALPH RICARDO, subject of the King of England, residing at London, in England, have invented certain new and useful Improvements in Driving Mechanism for Propellers, of which the following is a specification.

This invention relates to driving mechanism for propellers driven by internal combustion engines of the fixed or rotating type and has for its object to effect certain improvements in the construction and arrangement of the mechanism and the parts relating thereto.

The mechanism at present in use or which has previously been proposed for this purpose occasionally involves the use of gearing of the epicyclic type but it has been found difficult to overcome the disadvantages that result from unequal distribution of the load through the members composing this gear. The present improvements avoid these difficulties by enabling an equal distribution of the load to be effected in a simple form of epicyclic gearing.

The gearing to which the present invention is applied comprises an internally toothed ring, an externally toothed ring and a series of planetary pinions disposed between these two rings. According to this invention the inner and externally toothed ring is mounted on one end of a member preferably tubular whose other end is fixed to a convenient stationary part the length of the tubular member being such that it has sufficient flexibility to permit the toothed ring on the end of it to have a small amount of free or "floating" movement about its center that is to say this ring will be free to move to a limited extent in any direction substantially radially with relation to the axis of the gear. This ring is thus able to assume such a position with relation to the planetary pinions which mesh with it that it will compensate for any eccentricity in the paths followed by the axes of the pinions about the gear axis and bring about an equal distribution of the load while also avoiding uneven wear. In applying the invention for example to an engine of the non-rotating type which is arranged to drive a propeller through reducing gearing there is mounted on one end of the crank shaft an internally toothed ring while an externally toothed ring which is disposed in the plane of the internally toothed crank shaft ring is mounted on one end of a tubular member whose other end is fixed to a stationary casing which for example may be a fixed nose piece. The length of this tubular member is such that it will have sufficient flexibility to permit the toothed ring on the end of it to have a small amount of free or floating movement about its center that is to say this ring will be free to move to a limited extent radially with relation to the axis of the gear. A length of shafting preferably resilient is disposed within the tubular member and carries on one end of it two or more planetary pinions which lie between the internally toothed crank shaft ring and the externally toothed fixed ring, while the other end of this shaft is connected to the propeller hub. This propeller shaft is preferably of such length and construction as to operate as a torsion shaft. Thus while the planetary pinions carried on the end of the propeller shaft are so mounted that owing to the construction of this shaft these gear members are permitted to "float" in a rotational sense owing to the twisting movement that can occur throughout the length of the propeller shaft, on the other hand the externally toothed fixed ring member of the gear can float in a radial sense and thus enable the load to be equally distributed between the pinions. In this way it becomes possible to compensate for any inaccuracy or uneven wear in the parts of the gear and the support for the stationary member is such that while having the strength necessary to resist rotation it has sufficient flexibility to enable the stationary member to assume its natural position with relation to the planetary pinions which will accord with an equal distribution of the load throughout the gearing.

The invention may be put into practice in various ways and the accompanying drawing illustrates by way of example in longitudinal sectional elevation a convenient construction which may be employed in driving an air propeller.

On one end of the crank shaft A of the engine, which is nonrotating and for example may be of the V-type, is mounted in some suitable manner an internally toothed ring B. As shown this ring B is carried on a disk B′ fixed to a flange A′ formed or mounted at the end of the crank shaft A. Attached to the end of the crank shaft casing C is the conical end portion D of a hollow nose piece D′. The main portion of this nose piece D′ carries externally bearings on which runs a propeller hub E a thrust bearing F also being provided so that all strains set up by the propeller are taken by the nose piece D D′. Within the enlarged portion D of the nose piece is disposed a tube G one end of which is outwardly flanged as at G′ and rigidly connected to the nose piece. The other end of the tube G which is directed toward the crank shaft is also outwardly flanged as at $G^2$ and carries an externally toothed ring $G^3$. The length of the fixed tube G is such that it has a certain amount of flexibility sufficient to permit the toothed ring $G^3$ to assume such a position about its center or about the axis of the fixed tube G or of the gearing viewed as a whole that equal distribution of the load is attained between the planetary members of the gear. These planetary pinions H of which two or more may be employed lie between and engage both with the internally toothed ring B and the externally toothed ring $G^3$ and are mounted on stud axles H′ carried by a disk J which is mounted on one end of a propeller shaft K. The other end of this propeller shaft is connected to the end of the propeller hub E around the end of the nose piece D′ in some convenient manner as for instance by means of alternating and engaging projections or teeth formed respectively on the interior of the end of the hub E and as at K′ on the exterior of the end of the shaft K. The propeller shaft K is constructed so that it has a certain resiliency which will permit it as it were to wind up and unwind in order to compensate for the periodic torsional vibrations which tend to occur in the crank shaft. The end of the propeller shaft K which carries the planetary pinions H thus floats in a torsional sense while the external toothed ring $G^3$ on the end of the fixed tubular member G floats in a radial sense.

The gear members B, H and $G^3$ and the parts to which they are connected may be constructed arranged and relatively disposed in various ways in accordance with requirements. The invention may be applied to different types of engine whether rotating or stationary and it may be utilized in conjunction with various methods of transmitting the power from the engine to the propeller.

The details of construction may be varied to meet requirements and the length and diameter of the fixed tubular or other member G may be modified as found desirable in order to attain the desired effect and permit the necessary movement of the toothed ring $G^3$ on the free end of this member. The manner in which this member is connected to the nose piece D D′ or other fixed part may be modified as found desirable.

What I claim as my invention and desire to secure by Letters Patent is:—

1. In mechanism for driving an air propeller the combination of a driving shaft, an internally toothed ring mounted on the end of this shaft, a hollow member one end of which is fixed while the other end is free and directed toward the end of the driving shaft the length and structure of this member being such that its free end can float about its axis, an externally toothed ring mounted on the free end of the hollow member and within the internally toothed ring, a driven shaft arranged coaxially with the driving shaft, a plurality of pinions mounted on one end of this driven shaft all disposed between and gearing with both the toothed rings, and a propeller coupled to the other end of the driven shaft as set forth.

2. In mechanism for driving an air propeller the combination of a driving shaft, an internally toothed ring mounted on the end of this shaft, a tubular member one end of which is fixed while the other end is free and directed toward the end of the driving shaft the length and structure of this member being such that it has a degree of flexibility so that its free end can float about its axis, a flange on the free end of the tubular member, an externally toothed ring mounted on the flange of the tubular member so as to lie within the internally toothed ring, a driven shaft arranged coaxially with the driving shaft, a plurality of pinions mounted on one end of this driven shaft all disposed between and gearing with both the toothed rings, and a propeller coupled to the other end of the driven shaft as set forth.

3. In mechanism for driving an air propeller the combination of a driving shaft, a disk-like member on the end of this shaft, an internally toothed ring mounted on this disk-like member, a hollow member one end of which is fixed while the other end is free and directed toward the end of the driving shaft the length and structure of this member being such that its free end can float about its axis, an externally toothed ring mounted on the end of the hollow member and within the internally toothed ring, a driven shaft arranged coaxially with the driving shaft, a disk-like member on one end of this driven shaft, a plurality of pinions mounted on this disk-like member and all disposed between and gearing with both the toothed rings, and a propeller coupled to the other end of the driven shaft as set forth.

4. In mechanism for driving an air propeller the combination of a driving shaft, an internally toothed ring mounted on the end of this shaft, a hollow member one end of which is fixed while the other end is free and directed toward the end of the driving shaft the length and structure of this member being such that its free end can float about its axis, an externally toothed ring mounted on the free end of the hollow member and within the internally toothed ring, a fixed hollow nose piece to the interior of which the fixed end of the hollow member is attached, a driven shaft arranged coaxially with the driving shaft and disposed within the hollow nose piece and extending through the hollow member, a plurality of pinions mounted on one end of this driven shaft and disposed between and gearing with both the toothed rings, and a propeller coupled to the other end of the driven shaft as set forth.

5. In mechanism for driving an air propeller the combination of a driving shaft, an internally toothed ring mounted on the end of this shaft, a hollow member one end of which is fixed while the other end is free and directed toward the end of the driving shaft the length and structure of this member being such that its free end can float about its axis, an externally toothed ring mounted on the free end of the hollow member and within the internally toothed ring, a fixed hollow nose piece to the interior of which the fixed end of the hollow member is attached, bearings on the exterior of this nose piece, a propeller rotatable on these bearings, a driven shaft arranged coaxially with the driving shaft and disposed within the hollow nose piece this driven shaft extending at one end through the hollow member and at the other end to the outer end of the nose piece, a plurality of pinions mounted on the inner end of this driven shaft and disposed between and gearing with both the toothed rings, and a coupling between the outer end of the driven shaft and the propeller on the nose piece as set forth.

6. In mechanism for driving an air propeller the combination of a driving shaft, an internally toothed ring mounted on the end of this shaft, a tubular member one end of which is fixed while the other end is free and directed toward the end of the driving shaft the length and structure of this member being such that it has a degree of flexibility so that its free end can float about its axis, a flange on the free end of the hollow member, an externally toothed ring mounted on the flange of the hollow member so as to lie within the internally toothed ring, a driven shaft arranged coaxially with the driving shaft and of such length as to have a degree of resiliency this shaft being disposed so as to float without being directly carried in bearings, a plurality of pinions mounted on one end of this driven shaft all disposed between and gearing with both the toothed rings, a propeller coupled to the other end of this driven shaft, and bearings on which the propeller rotates as set forth.

7. In mechanism for driving an air propeller the combination of a driving shaft, an internally toothed ring mounted on the end of this shaft, a tubular member one end of which is fixed while the other end is free and directed toward the end of the driving shaft the length and structure of this member being such that it has a degree of flexibility so that its free end can float about its axis, a flange on the free end of the tubular member, an externally toothed ring mounted on the flange of the tubular member so as to lie within the internally toothed ring, a fixed hollow nose piece to the interior of which the fixed end of the tubular member is attached, a driven shaft arranged coaxially with the driving shaft and disposed within the hollow nose piece the shaft being of such length as to have a degree of resiliency and extending at one end through the tubular member and at the other end to the outer end of the nose piece the shaft being arranged so as to float without being directly carried in bearings, a plurality of pinions mounted on the inner end of this driven shaft and disposed between and gearing with both the toothed rings, and a propeller coupled to the outer end of the driven shaft as set forth.

8. In mechanism for driving an air propeller the combination of a driving shaft, a disk-like member on the end of this shaft, an internally toothed ring mounted on this disk-like member, a tubular member one end of which is fixed while the other end is free and directed toward the end of the driving shaft the length and structure of this member being such that it has a degree of flexibility so that its free end can float about its axis, a flange on the free end of the tubular member, an externally toothed ring mounted on the flange of the tubular member so as to lie within the internally toothed ring, a fixed hollow nose piece to the interior of which the fixed end of the tubular member is attached, bearings on the exterior of this nose piece, a propeller rotatable on these bearings, a driven shaft arranged coaxially with the driving shaft and disposed within the hollow nose piece so as to float without being directly carried in bearings the shaft being of such length as to have a degree of resiliency and extending at one end through the tubular member and at the other end to the outer end of the hollow nose piece, a disk-like member on the inner end of this driven shaft, a plurality of pinions mounted on this disk-like member and all disposed between and gearing with the toothed rings and a coupling between the outer end of the driven shaft and the corresponding end of the propeller as set forth.

In testimony whereof I have signed my name to this specification in the presence of two subscribing witnesses.

HARRY RALPH RICARDO.

Witnesses:
A. J. HALL,
R. BAGGOTT.